United States Patent
Jain et al.

(10) Patent No.: US 11,580,596 B2
(45) Date of Patent: *Feb. 14, 2023

(54) SHARED EXPENSE MANAGEMENT

(71) Applicant: Capital One Services, LLC, McLean, VA (US)

(72) Inventors: Ashish Jain, McLean, VA (US); Vishal Puri, Ashburn, VA (US); David Dao, Silver Spring, MD (US); Gagan Kanjlia, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/514,509

(22) Filed: Jul. 17, 2019

(65) Prior Publication Data

US 2019/0355056 A1    Nov. 21, 2019

Related U.S. Application Data

(63) Continuation of application No. 14/547,453, filed on Nov. 19, 2014, now Pat. No. 10,402,899.

(Continued)

(51) Int. Cl.
| | |
|---|---|
| *G06Q 40/02* | (2012.01) |
| *G06Q 20/10* | (2012.01) |
| *G06Q 40/00* | (2012.01) |
| *G06Q 20/40* | (2012.01) |
| *G06Q 20/22* | (2012.01) |
| *G06Q 20/32* | (2012.01) |

(52) U.S. Cl.
CPC ............ *G06Q 40/02* (2013.01); *G06Q 20/10* (2013.01); *G06Q 20/102* (2013.01); *G06Q 20/223* (2013.01); *G06Q 20/3223* (2013.01); *G06Q 20/4016* (2013.01); *G06Q 40/00* (2013.01)

(58) Field of Classification Search
CPC ...... G06Q 40/02; G06Q 20/10; G06Q 20/102; G06Q 20/223; G06Q 20/3223; G06Q 20/4016
See application file for complete search history.

(56) References Cited

U.S. PATENT DOCUMENTS

| | | | | |
|---|---|---|---|---|
| 7,661,586 B2 * | 2/2010 | Robbins, Jr. | ......... | G06Q 20/102 |
| | | | | 235/380 |
| 7,693,771 B1 * | 4/2010 | Zimmerman | .......... | G06Q 40/00 |
| | | | | 705/36 R |

(Continued)

OTHER PUBLICATIONS

Lowrey, Annie, "Make Them Pay", Moneybox, Mar. 17, 2011. (Year: 2011).*

*Primary Examiner* — Eric T Wong
(74) *Attorney, Agent, or Firm* — Perkins Coie LLP

(57) ABSTRACT

Systems and methods are provided for managing shared expenses. The systems and methods may include a financial service provider identifying shared expenses in a customer's transaction history with software application executed on a server or personal computing device. The financial service provider may identify other individuals with whom the customer shares the expense, and send requests for reimbursement on the customer's behalf. The financial service provider ay monitor the status of reimbursement payments, and send reminders as necessary until the shared expense has been reimbursed.

20 Claims, 12 Drawing Sheets

Related U.S. Application Data

(60) Provisional application No. 61/906,601, filed on Nov. 20, 2013.

(56) References Cited

U.S. PATENT DOCUMENTS

| | | | | |
|---|---|---|---|---|
| 8,401,938 B1* | 3/2013 | Chapman | G06Q 20/3255 | 705/34 |
| 8,965,798 B1* | 2/2015 | Mackrell | G06Q 30/06 | 705/30 |
| 9,262,754 B1* | 2/2016 | Jawharkar | G06Q 30/0633 | |
| 2008/0195510 A1* | 8/2008 | Olliphant | G06Q 40/12 | 705/30 |
| 2009/0094123 A1* | 4/2009 | Killian | G06Q 20/20 | 705/16 |
| 2011/0145116 A1* | 6/2011 | Lawson | G06Q 30/04 | 705/34 |
| 2012/0150728 A1* | 6/2012 | Isaacson | G06Q 20/28 | 705/39 |
| 2013/0013494 A1* | 1/2013 | Perlman | G06Q 20/06 | 705/39 |
| 2013/0085931 A1* | 4/2013 | Runyan | G06Q 20/322 | 705/40 |
| 2014/0019345 A1* | 1/2014 | Eliscu | G06Q 20/102 | 705/40 |
| 2014/0074701 A1* | 3/2014 | Kingston | G06Q 20/14 | 705/40 |
| 2014/0214652 A1* | 7/2014 | Zheng | G06Q 20/227 | 705/39 |
| 2015/0120345 A1* | 4/2015 | Rose | G06Q 20/3224 | 705/5 |

* cited by examiner

SHARED EXPENSE MANAGEMENT

CROSS REFERENCE TO RELATED APPLICATION

This application is a continuation of U.S. patent application Ser. No. 14/547,453, filed on Nov. 19, 2014, which claims priority under 35 U.S.C. § 119 to U.S. provisional patent application No. 61/906,601, filed on Nov. 20, 2013, and entitled "Shared Expense Management." The disclosure of the above-referenced applications are expressly incorporated herein by reference in their entirety.

TECHNICAL FIELD

The disclosed embodiments generally relate to systems and methods for sharing financial expenses, and more particularly, to systems and methods for sending, requesting, and receiving money associated with shared expenses.

BACKGROUND

Individuals frequently incur expenses related to experiences that they shared with other friends or roommates. These shared experiences include social events like concerts, group dinners, movie outings, etc. Frequently, one person in the group pays the full price upfront for the dinner or event tickets, and then seeks reimbursement from the other persons in the group. Likewise, one roommate in a group living situation often collects payment from other roommates, and then pays monthly rent and utilities expenses. The individual who pays the shared expense for the group often faces the task of manually calculating the amount that each person owes, seeking reimbursement from each person, and keeping track of who has paid and who has not paid.

Individuals do not have an easy way to manage their shared expenses. They must remember which expenses were shared with which people, and how much money each of those people owe. Some try to track their shared expenses using spreadsheets. But, the amount of manual calculation, data entry, and organization required can lead to errors from miscalculation and forgetfulness. When managing monthly expenses such as rent and utilities, individuals are also challenged with the task of setting deadlines for collecting roommates' shares, and enforcing their deadlines.

Furthermore, reimbursement is usually provided in the form of a cash or check, and the individual managing the reimbursements must endure the cumbersome process of handling checks or physically collecting cash. For example, transferring cash requires the payee and payor to meet in person. Sending checks, on the other hand, takes time for the check to arrive in the mail, and check must still be cashed or deposited before funds are available for paying expenses.

Newer person-to-person (P2P) payment services such as Paypal™ allow electronic transmission of money from one Paypal account to another. But, P2P users are still required to manually manage the shared expense, and open an account with the P2P service. Once money is received, the P2P user must still transfer the money from their P2P account into their bank account before using the money or paying the shared expense. Further, P2P systems typically involve cumbersome registration processes.

SUMMARY

Disclosed embodiments provide methods and systems for managing shared expenses. Aspects of the disclosed shared expense management methods and systems reduce burdens on the individual, and provide a convenient, efficient, and easy-to-use solution for identifying shared expenses, calculating reimbursement shares, sending requests for reimbursement, and tracking incoming reimbursement payments. For example, the automatic calculation of reimbursement shares greatly reduces the risk of errors. Tracking, reminders, and advance reimbursement requests for recurring expenses also provide a payee with a convenient way to collect dues from multiple payors.

Consistent with a disclosed embodiment, a system for managing shared expenses is provided. The system may include a storage device storing instructions, and at least one processor configured to execute the instructions in the storage device. When the instructions are executed, the processor may detect a shared expense based at least on purchase transaction information associated with a first user, identify one or more second users associated with the shared expense based at least on the purchase transaction information, generate one or more requests for reimbursement for a share amount that is less than the shared expense, transmit the one or more reimbursement requests to at least one of the one or more second users indicating the share amount, and receive reimbursement information for a payment directed to the first user for the share amount in response to the request for reimbursement.

Consistent with another disclosed embodiment, a computer-implemented method for managing shared expenses is provided. The method may include detecting, by one or more processors, a shared expense based at least on purchase transaction information associated with a first user, identifying one or more second users associated with the shared expense based at least on the purchase transaction information, generating, by the one or more processors, one or more requests for reimbursement for a share amount that is less than the shared expense, transmitting, by the one or more processors, the one or more reimbursement requests to at least one of the one or more second users indicating the share amount, and receiving, by the one or more processors, reimbursement information for a payment directed to the first user for the share amount in response to the request for reimbursement.

Consistent with other disclosed embodiments, tangible, non-transitory computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

The disclosed embodiments are directed to systems and methods for managing shared expenses. A computer-executed software application ("app"), such as a shared expense app may be provided by a financial service provider ("FSP"), which may identify shared expenses in the transaction history for a customer of the FSP. The FSP may be a bank, credit card company, or other entity which handles financial transactions for individuals. Transactions may include credit card transactions, debit card transactions, checking transactions, issuance of loans, and/or cash deposits and withdrawals. The shared expense app may be a standalone software application executed by FSP server processor(s), a standalone software application for a personal computing device such as personal computer software or a mobile device app, or part of another software application provided by the FSP for managing finances related to banking, checking credit cards, debit cards, and/or loans.

A "payee," as discussed herein, may refer to the FSP customer who has paid or will pay the shared expense. The payee may receive reimbursement payments from other individuals. A "payor," as discussed herein, may refer to an individual who receives a reimbursement request from the payee, and who sends reimbursement payments to the payee for their share of the shared expense.

A learning engine program may identify shared expenses in the FSP customer's transaction history automatically using predictive analytics and/or a learning engine, which improves its own accuracy over time. The computer-executed software application may be executed by one or more servers operated by the FSP, on a personal computing device associated with the customer, or both the servers and personal computing device in a distributed-computing arrangement.

Once a shared expense is identified, either automatically by the shared expense management system, or manually input by the FSP customer, the shared expense app may allow the FSP customer to generate and send requests for reimbursement from others, manage reimbursement payments received from others, and/or coordinate requests and payments for recurring expenses such as monthly rent.

Shared Expense Management System Components and Configuration

Figure 1:
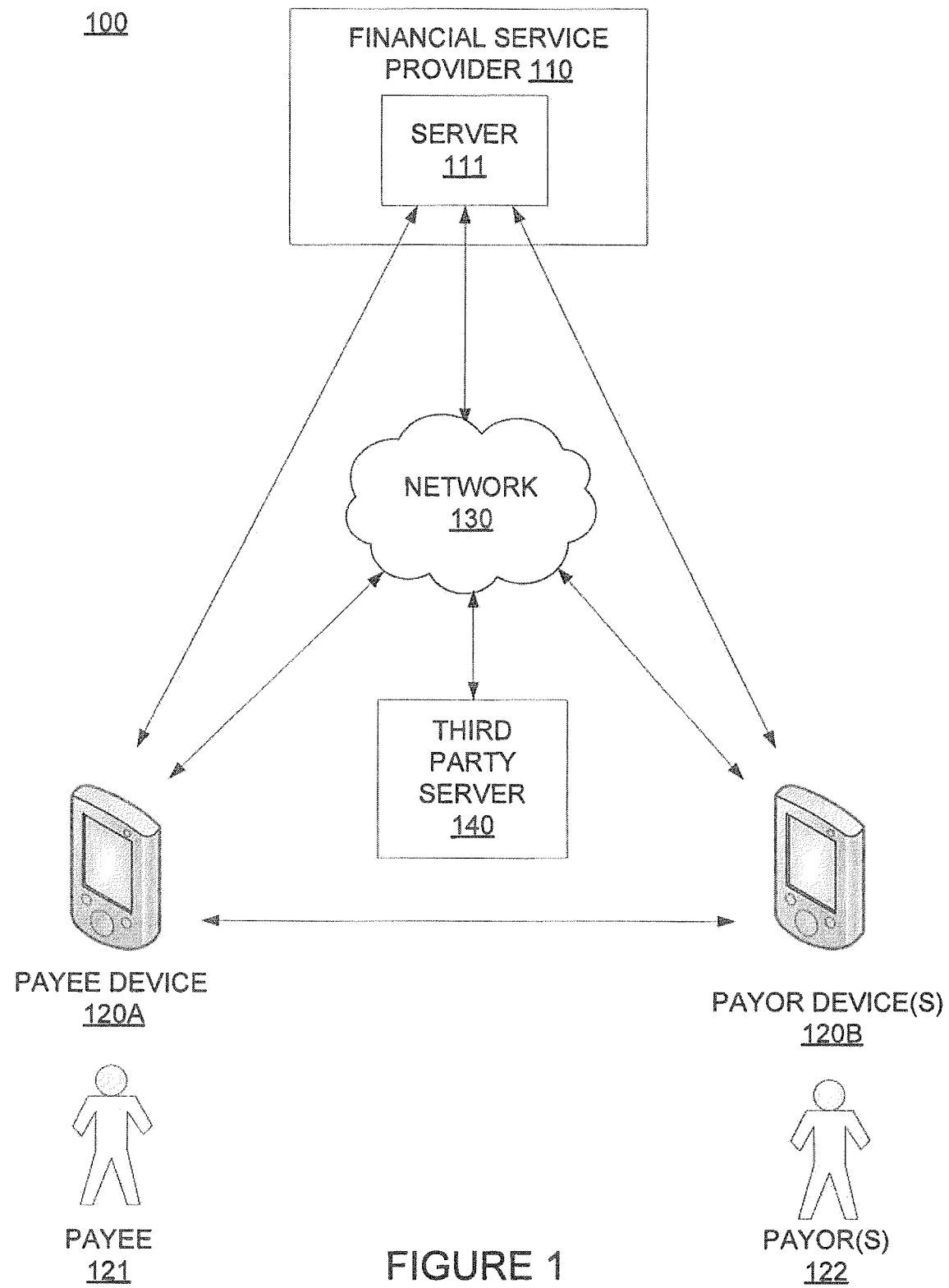
FIG. 1 is a diagram of an exemplary system that may be used to manage shared expenses, consistent with disclosed embodiments.

FIG. 1 shows a diagram of an exemplary system that may be configured to perform one or more software processes that, when executed by one or more processors, manage shared expenses consistent with disclosed embodiments. The components and arrangements shown in FIG. 1 are not intended to limit the disclosed embodiments, as the components used to implement the disclosed processes and features may vary.

In accordance with disclosed embodiments, a shared expense management system 100 may include a financial service provider ("FSP") 110, one or more server(s) 111, at least one payee device 120A, one or more payor device(s) 120B, and one or more third party server(s) 140, each communicating through network 130. Payee device 120A may be connected to FSP 110 via server 111 and to payor device 120B directly or via network 130. Server 111 may be connected to third party server 140 directly or via network 130 (connection not shown in figure). Other components known to one of ordinary skill in the art may be included in shared expense management system 100 to process, transmit, provide, and receive information consistent with the disclosed embodiments.

Payee device 120A may allow one or more FSP 110 customers, such as payee 121, to generate, send, and manage reimbursement requests for shared expenses. Payor device 120B may allow one or more payors 122, who may or may not be FSP 110 customers, to receive reimbursement requests, and send reimbursement payment to payee 121. Payee device 120A and payor device 120B may be personal computing devices. For example, payee device 120A and payor device 120B may include general purpose or notebook computers, mobile devices with computing ability, a server, desktop computers, tablets, smartphones, or any combination of these computers and/or affiliated components. In one embodiment, payee device 120A may be a computer system or mobile computer device that is operated by payee 121 who is a FSP customer.

Payee device 120A and payor device 120B may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™ or other types of operating systems. Accordingly, embodiments of the disclosed invention will operate and function with computer systems running any type of operating system. Payee device 120A and payor device 120B may also include communication software that, when executed by a processor, provides communications with network 130, such as Web browser software, tablet or smart hand held device networking software, etc.

FSP 110 may be a bank, credit card company, merchant, lender, and the like, offering financial services to customers. FSP 110 may operate one or more server(s) 111. Server 111 may be a computer-based system including computer system components, desktop computers, workstations, tablets, hand held computing devices, memory devices, and/or internal network(s) connecting the components.

Network 130 may comprise any type of computer networking arrangement used to exchange data. For example, network 130 may be the Internet, a private data network, virtual private network using a public network, and/or other suitable connection(s) that enables system 100 to send and receive information between the components of system 100. Network 130 may also include a public switched telephone network ("PSTN") and/or a wireless network.

In some embodiments, server 111 may receive information from one or more third party servers 140 via network 130. Third party server 140 may include a computer-based system operated by a merchant, credit reporting agency, Automated Clearing House (ACH) system, or other data reporting source having pricing information about merchants or vendors such as Zagat™ or Yelp™. Merchants may include, for example, companies that sell products and/or services to consumers. In some aspects, merchants may include companies selling products and/or services often shared by groups of consumers. For example, merchants may include companies such as Ticketmaster™, StubHub™, etc. selling tickets to social events. In some embodiments, an entity that tracks average housing and utility prices may operate third party server 140, and send housing and utility price data to FSP 110 server 111. In some embodiments, one or more third party servers 140 may be operated by an e-mail service, telephone service, or social network. In such embodiments, third party server 140 sends information to server 111 regarding a payee 121's e-mail communications, telephone call logs, and/or social network profile information including payee 121's interaction with other social network members, and events that payee 121 has or will attend. In some embodiments, third party server 140 only provides such information to FSP server 111 based on payee 121's authorization.

Figure 2:
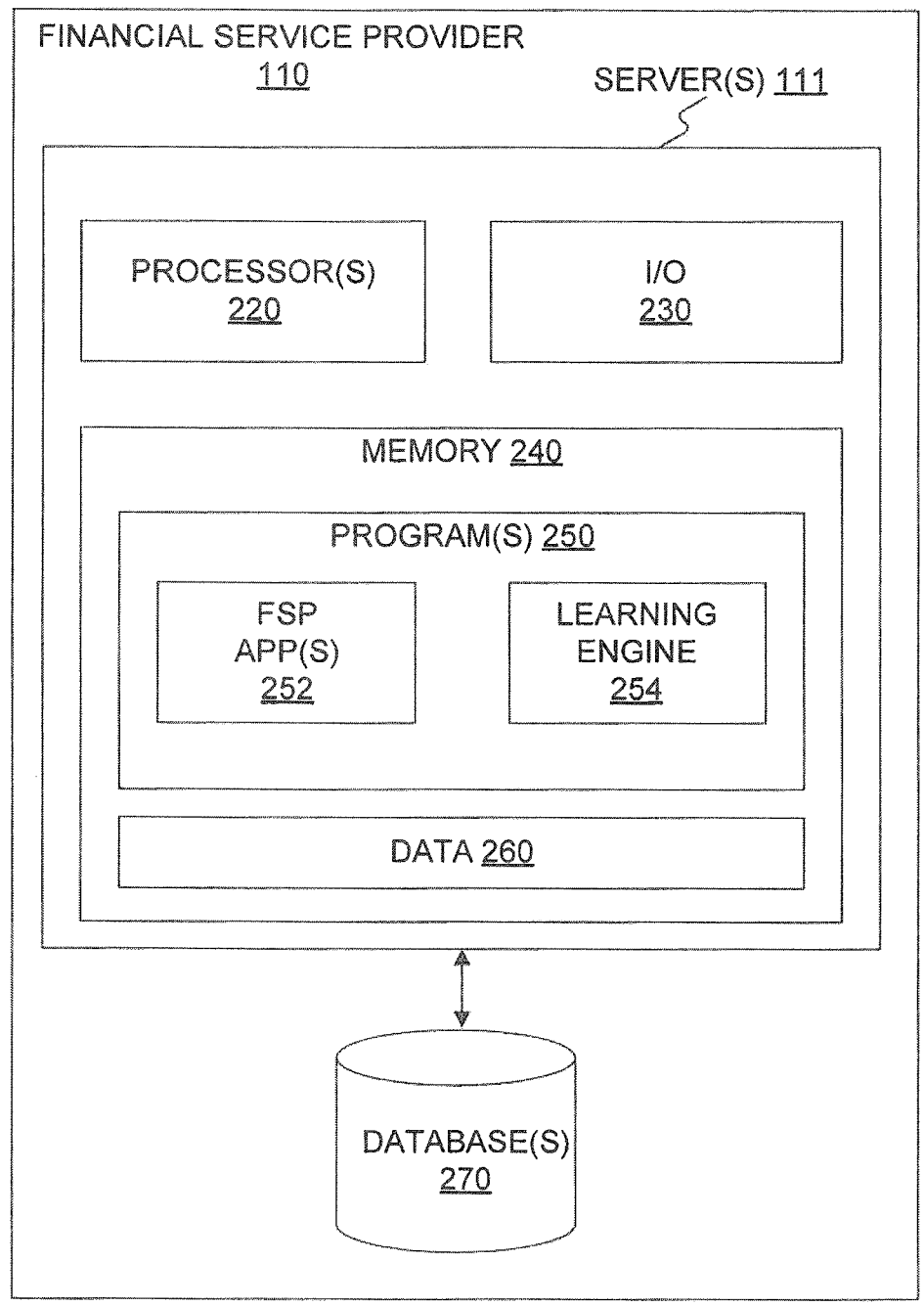
FIG. 2 is a component diagram of an exemplary financial service provider.

FIG. 2 shows a diagram of an exemplary system FSP 110, consistent with disclosed embodiments. As shown, FSP 110 may include one or more server 111. Although discussed here in relation to FSP 110, it should be understood that variations of server 111 may be used by other components of system 100, including payee device 120A, payor device 120B, and third party server 140.

Server 111 may include one or more processor 220, an input/output ("I/O") device 230, and memory 240 containing, for example, an operating system (not shown), programs 250, and data 260. Server 111 may be a single server or may be configured as a distributed computer system including multiple servers or computers that interoperate to perform one or more of the processes and functionalities associated with the disclosed embodiments.

Processor 220 may be one or more known processing devices, such as a microprocessor from the Pentium™ family manufactured by Intel™ or the Turion™ family manufactured by AMD™. Processor 220 may constitute a single core or multiple core processor that executes parallel processes simultaneously. For example, processor 220 may be a single core processor configured with virtual processing technologies. In certain embodiments, processor 220 may use logical processors to simultaneously execute and control multiple processes. Processor 220 may implement virtual machine technologies, or other known technologies to provide the ability to execute, control, run, manipulate, store, etc. multiple software processes, applications, programs, etc. In another embodiment, processor 220 may include a multiple-core processor arrangement (e.g., dual, quad core, etc.) configured to provide parallel processing functionalities to allow server 111 to execute multiple processes simultaneously. One of ordinary skill in the art would understand that other types of processor arrangements could be implemented that provide for the capabilities disclosed herein.

FSP 110 may include one or more storage devices configured to store information used by processor 220 (or other components) to perform certain functions related to the disclosed embodiments. In one example, server 111 may include memory 240 that includes instructions to enable processor 220 to execute one or more applications, such as server applications, a shared expense management application, network communication processes, and any other type of application or software known to be available on computer systems. Alternatively, the instructions, application programs, etc. may be stored in an external storage in direct communication with server 111, such as one or more database(s) 270 or available from a memory over a network (not shown). Database 270 or other external storage may be a volatile or non-volatile, magnetic, semiconductor, tape, optical, removable, non-removable, or other type of storage device or tangible (i.e., non-transitory) computer-readable medium.

In one embodiment, server 111 may include memory 240 that includes instructions that, when executed by processor 220, perform one or more processes consistent with the functionalities disclosed herein. Methods, systems, and articles of manufacture consistent with disclosed embodiments are not limited to separate programs or computers configured to perform dedicated tasks. For example, server 111 may include memory 240 that may include one or more programs 250 to perform one or more functions of the disclosed embodiments. Moreover, processor 220 may execute one or more programs located remotely from shared expense management system 100. For example, server 111 may access one or more remote programs, that, when executed, perform functions related to disclosed embodiments.

Programs 250 stored in memory 240 and executed by processor(s) 220 may include one or more FSP app(s) 252 and learning engine 254. FSP app(s) 252 may cause processor(s) 220 to execute one or more processes related to financial services provided to customers including, but not limited to, processing credit and debit card transactions, checking transactions, fund deposits and withdrawals, transferring money between financial accounts, lending loans, processing payments for credit card and loan accounts, identifying shared expenses, sending notifications to payee 121 regarding identified shared expenses, generating reimbursement requests, identifying recipients for reimbursement requests, routing reimbursement requests to recipients, receiving reimbursement payment from recipients—i.e., payors 122, updating payee 121's financial account to reflect received payments, identifying recurring shared expenses, sending payment for recurring shared expenses, and any other processes related to financial services, particularly processes related to the shared expense management methods described herein.

Server 111 may use learning engine 254 to employ predictive analytics to automatically identify potential shared expenses and possible recipients for reimbursement requests corresponding to the identified shared expenses. In some embodiments. Server 111 may continuously improve the accuracy of learning engine 254 over time by collecting feedback from FSP customers, such as payee 121, regarding the accuracy of identified shared expenses and reimbursement request recipients. Collected feedback may be stored, for example, in memory 240 and/or database 270. Server 111 may employ one or more regression algorithms, clustering algorithms, or other known data analysis techniques to analyze collected data. Learning engine 254 may employ such data analysis and crowd-sourcing techniques to learn new patterns and thresholds in transaction data indicative of shared expenses versus individual, non-shared expenses.

Memory 240 and database 270 may include one or more memory devices that store data and instructions used to perform one or more features of the disclosed embodiments. Memory 240 and database 270 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

Sever 111 may also be communicatively connected to one or more remote memory devices (e.g., databases (not shown)) through network 130 or a different network. The remote memory devices may be configured to store information and may be accessed and/or managed by server 111. By way of example, the remote memory devices may be document management systems, Microsoft SQL database, SharePoint databases, Oracle™ databases, Sybase™ databases, or other relational databases. Systems and methods consistent with disclosed embodiments, however, are not limited to separate databases or even to the use of a database.

Server 111 may also include one or more I/O devices 230 that may comprise one or more interfaces for receiving signals or input from devices and providing signals or output to one or more devices that allow data to be received and/or transmitted by server 111 For example, server 111 may include interface components, which may provide interfaces to one or more input devices, such as one or more keyboards, mouse devices, and the like, that enable server 111 to receive input from an employee of FSP 110 (not shown).

Figure 3:
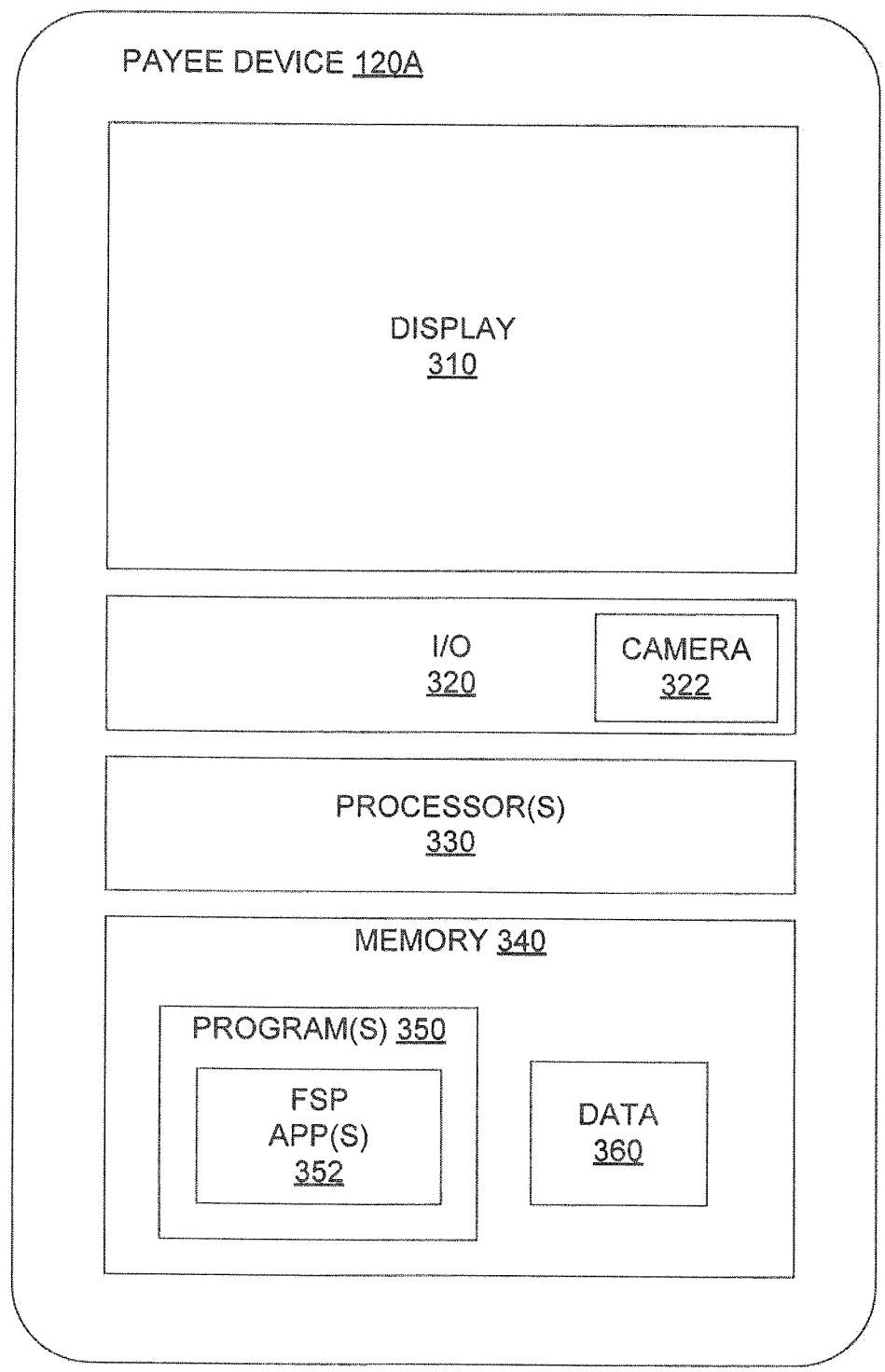
FIG. 3 is a component diagram of an exemplary payee device.

FIG. 3 shows an exemplary configuration of payee device 120A, consistent with disclosed embodiments. Payor device 120B (not shown) may have a similar configuration. As shown, payee device 120A may be configured with a display 310, input/output ("I/O") device(s) 320, one or more processor(s) 330, memory 340 that stores one or more program(s) 350 such as FSP app(s) 352, and data 360.

Display 310 may include one or more devices for displaying information, including but not limited to, liquid crystal displays (LCD), light emitting diode screens (LED), organic light emitting diode screens (OLED), and other known display devices.

I/O devices 320 may include one or more devices that allow payee device 120A to send and receive information. I/O devices 320 may include camera 322, to allow payee device 120A to receive, for example, pictures of receipts, bills taken by payee 121, etc. I/O devices 320 may also include one or more communication modules (not shown) for sending and receiving information from other components in shared expense management system 100 by, for example, establishing wired or wireless connectivity between payee device 120A to network 130, by establishing direct wired or wireless connections between payee device 120A and server 111, or between payee device 120A and payor device(s) 120B. Direct connections may include, for example, Bluetooth™, Bluetooth LE™, WiFi, near field communications (NFC), or other known communication methods which provide a medium for transmitting data between separate devices.

Processor(s) 330 may be one or more known computing devices, such as those described with respect to server 111 processor 220 in FIG. 2.

Memory 340 may be a volatile or non-volatile, magnetic, semiconductor, tape, optical, removable, non-removable, or other type of storage device or tangible (i.e., non-transitory) computer-readable medium that stores one or more program(s) 350 and data 360. Data 360 may include, as a non-limiting example, payee 121's personal contact list having names with associated phone numbers, e-mail addresses, and/or other information associated with the contact. Data 360 may also include, for example, payee device 120A settings, transaction history data, image data, and any other data pertinent to the usage of payee device 120A and the performance of methods disclosed herein.

Program(s) 350 may include operating systems (not shown) that perform known operating system functions when executed by one or more processors. By way of example, the operating systems may include Microsoft Windows™, Unix™ Linux™ Apple™ operating systems, Personal Digital Assistant (PDA) type operating systems, such as Microsoft CE™ or other types of operating systems. Accordingly, disclosed embodiments may operate and function with computer systems running any type of operating system. Payee device 120A may also include communication software that, when executed by a processor, provides communications with network 130, such as Web browser software, tablet, or smart hand held device networking software, etc. Payee device 120A may be a device that executes mobile applications for performing operations consistent with disclosed embodiments, such as a tablet or mobile device.

Program(s) 350 may also include FSP app(s) 352. Similar to FSP app(s) 252 executed by server 111, payee device 120A may execute one or more FSP app(s) 352 to perform processes related to financial services including, but not limited to, analyzing transaction history data to identify shared expenses, receiving data from server 111 regarding identified shared expenses, identifying reimbursement recipients, receiving data from server regarding identified recipients, sending feedback data to server 111 regarding the accuracy of identified shared transactions and recipients, receiving input from payee 121 regarding manually indicated shared expenses and/or recipients, reimbursement share amounts, receiving input from payee 121 regarding access to third party accounts, processing received reimbursement payments, initiating payment of recurring shared expenses, and any other processes related to financial services, particularly processes related to the shared expense management methods described herein.

Managing Shared Expenses

Figure 4:
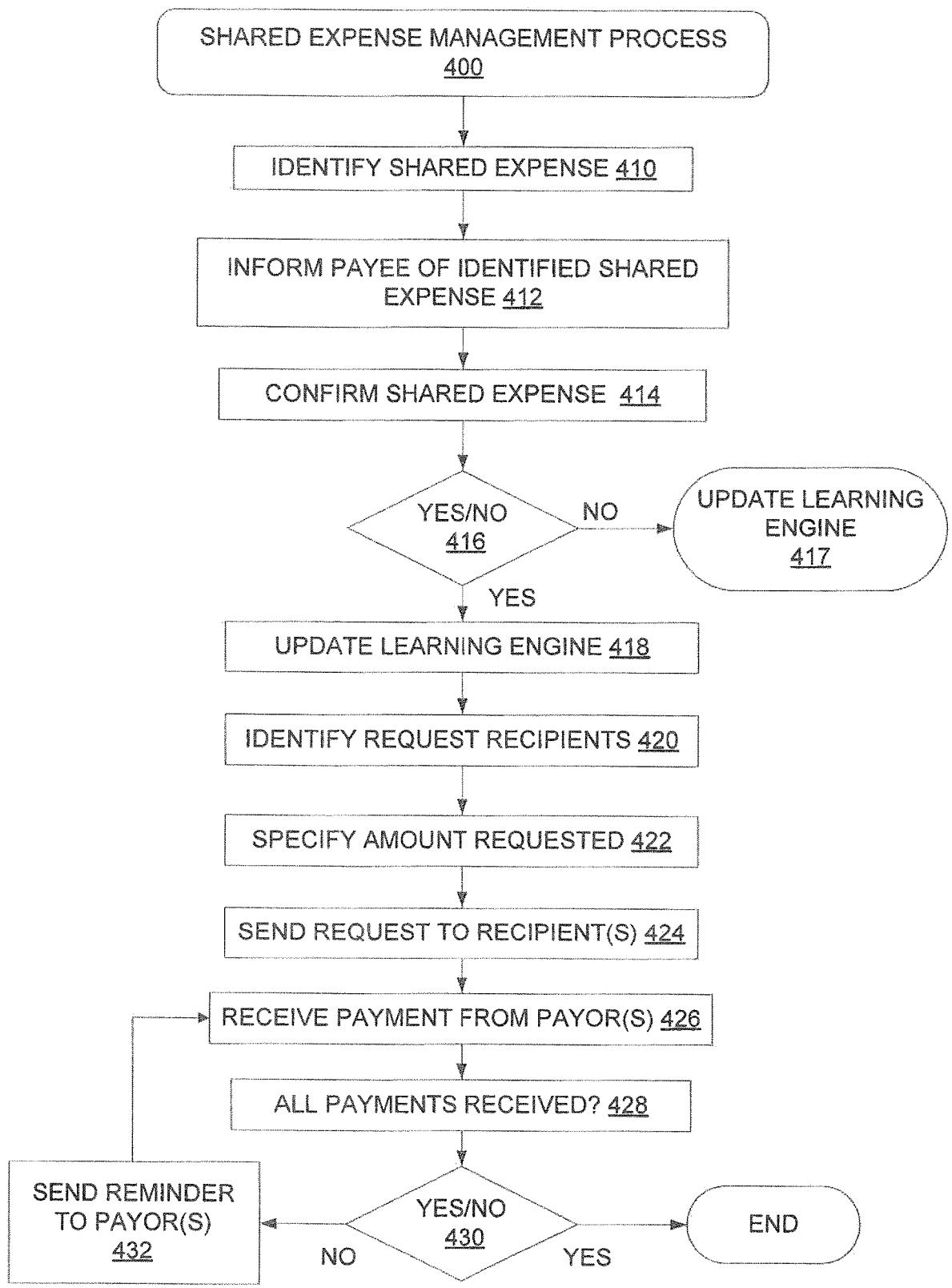
FIG. 4 is a flowchart of an exemplary method for managing a shared expense.

FIG. 4 shows a flowchart of an exemplary shared expense management process 400. For discussion purposes, the exemplary methods are described as performed by server 111. In some embodiments, however, payee device 120A may perform one or more disclosed method steps. In other embodiments, different components of shared expense system 100 (such as server 111 and payee device processor(s) 220) may perform various steps of the methods in a distributed-computing configuration.

In step 410, server 111 may scan payee 121's transaction history and identify a potential shared expense. In step 412, server 111 may inform payee 121 that a potential shared expense has been identified and, in step 414, may request confirmation from payee 121 to confirm whether the identified expense is a shared expense. If payee 121 indicates that the identified expense is not a shared expense in step 416, server 111 may update learning engine 254 in step 417 to improve future shared expense identification accuracy, and the process ends. After the process ends, server 111 may continue to monitor payee 121's transaction history (step not shown), and begin process 400 again upon detection of a new potential shared expense.

If payee 121 confirms that the identified expense is indeed a shared expense in step 416, server 111 may update learning engine 254 accordingly in step 418 to improve future shared expense identification accuracy. In step 420, server 111 may identify recipients in a reimbursement request for the shared expense. Recipients can be identified automatically by server 111, or manually by payee 121, as discussed in detail further below. After recipients are identified, server 111 may specify an amount to be requested from each recipient in step 422. Server 111 may automatically specify the amount requested by dividing the total amount into a number of equal shares based on the number of recipients and the payee. In some embodiments, unequal amounts may be specified for particular recipients automatically, as discussed later with respect to recurring shared expenses. Server 111 may also specify the amount requested according to a certain ratio, such as 40% paid by payee, and the remaining 60% split among request recipients. Server 111 may propose a ratio for transactions, for example, based on patterns that learning engine 254 identifies in a payee 121's transaction history, expense amounts, the identities of reimbursement request recipients, and/or the reimbursement amounts and/or ratios from similar previous shared expenses. In some embodiments, server 111 may specify the amount requested based on manual input received from payee 121 via payee device 120A.

In step 424, server 111 may send the reimbursement request to each of the identified recipients for the specified amounts. Reimbursement request recipients (referred to interchangeably as payor(s) 122) may receive the reimbursement requests (step not shown) and send payment to payee 121. In step 426, reimbursement payments from payors 122 may be received and processed. Server 111 may also determine whether some or all payments in response the reimbursement request have been received in step 428. For example, server 111 may identify a financial transaction associated with one or more of the payors 112 from account information associated with payee 121 stored by FSP 110. In some embodiments, FSP 110 may associate the identified financial transactions as a payment of step 426 based on the transaction data, including whether the amount matches the specified amount requested, the identity of the sender matches a request recipient, etc. In other embodiments, whether some or all payments have been received may be based on input provided by one or both of payee 121 (via, e.g., payee device) and payor(s) 122 (via, e.g., payor device(s)). If it is determined that all payments have been received in step 430 ("yes"), process 400 may end. If it is determined in step 430 that not all payments have been received ("no"), then a reminder message may be generated and sent to each non-paying recipient in step 432. The process then returns to step 426, where additional payments are received. In some embodiments, additional reminder messages are sent to non-paying recipients after a predetermined elapsed time (step not shown), until they send reimbursement. Server 111 may allow payee 121 to configure reminder messages to include certain phrases, to be sent at certain days or times, or to include additional late fee or interest charges.

Managing Recurring Shared Expenses

Figure 5A:
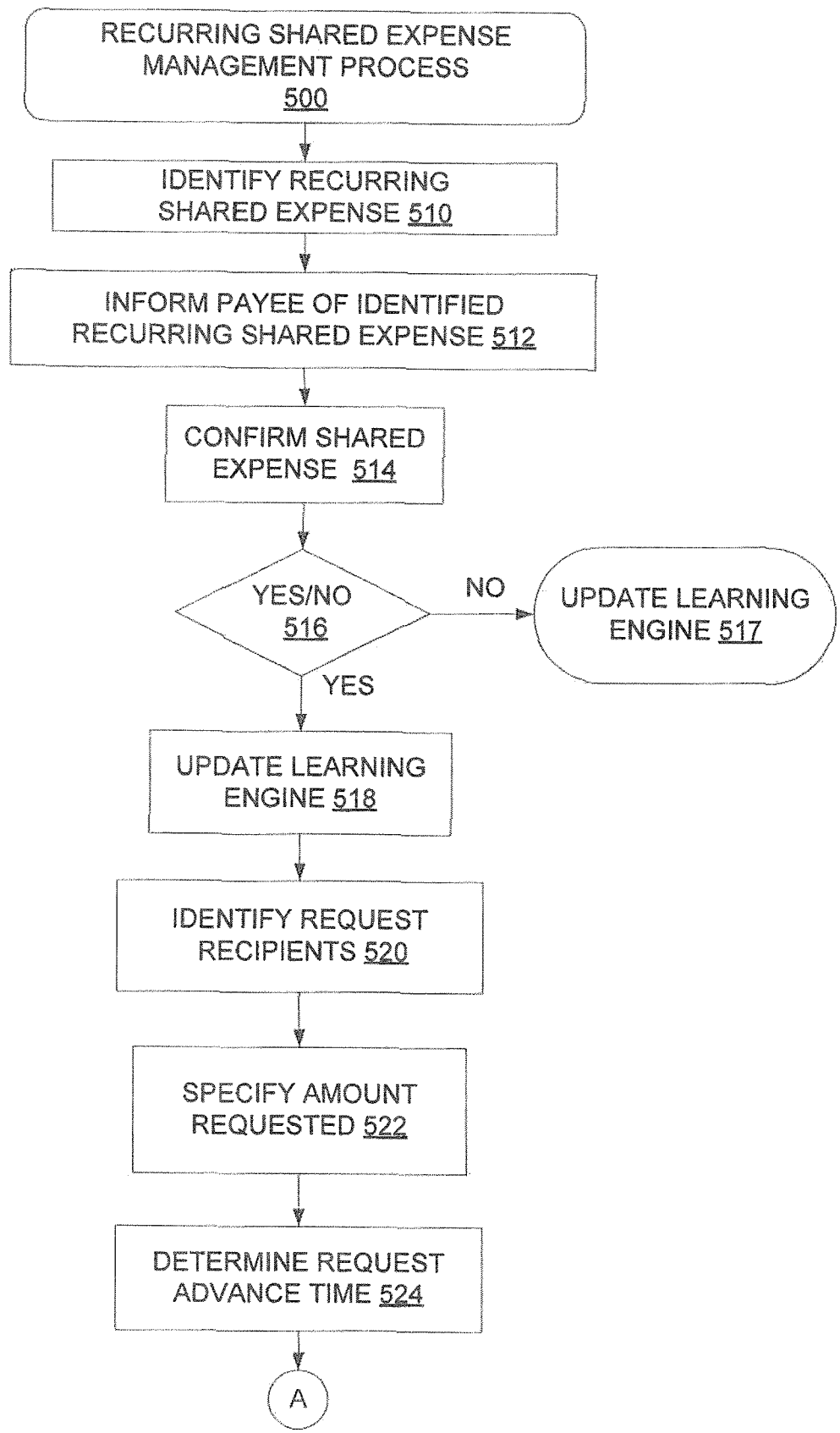
FIGS. 5A-5B are flowcharts of an exemplary method for managing a recurring shared expense.
Figure 5B:
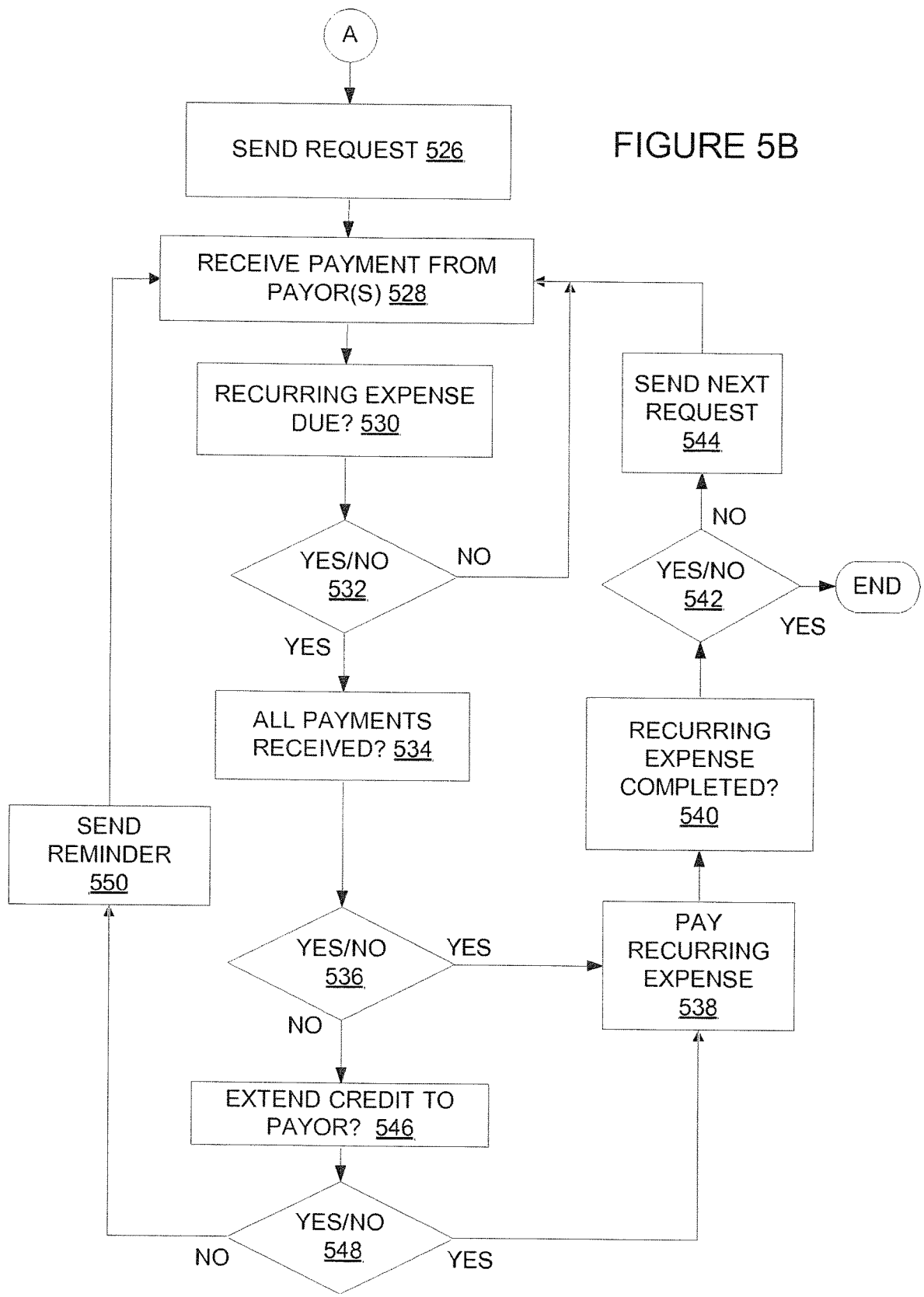

FIGS. 5A and 5B show an exemplary recurring shared expense management process 500 consistent with disclosed embodiments. Recurring shared expense management process 500 may begin when server 311 identifies a recurring shared expense in step 510. Recurring shared expenses may be identified by server 311 using learning engine 254 in a similar manner to that discussed with respect to FIG. 4. Recurring shared expenses may include, for example, housing and utility expense categories by default. Additional categories and threshold amounts may be identified by learning engine 254 of server 111 in response to manual categorization input received from payee 121 over time. Server 111 may inform payee 121 of the identified potential recurring shared expense in step 512 via, for example, a message displayed on payee device 120A. In step 514, server 111 may receive input from payee 121 confirming whether the identified expense is a recurring shared expense. If there is no recurring shared expense ("no" in step 516), then in step 517 server 111 may update learning engine 254 based on, for example, the transaction category, transaction amount, payee 121 information, etc. to improve identification accuracy for future recurring shared expense, and the may process end. If the process ends, server 111 may continue to monitor payee 121's transaction history (step not shown) and begin process 500 again upon detection of a new potential recurring shared expense.

If it is confirmed that there is a recurring shared expense ("yes" in step 516), server 111 may update learning engine 254 in step 518 with information associated with the shared expense, such as the category, amount, and payee 121 information. In step 520, server 111 may identify recipients in a reimbursement request form for the recurring shared expense. Recipients for recurring shared expense requests may be identified, for example, based on prior similar transactions. For example, if the identified recurring shared expense is a rent payment, and previous rent payments made at a similar time of the month for a similar amount involved payors A, B, and C, then A, B, and C may be automatically identified as possible recipients for the new request. In some embodiments, recipients may be identified automatically by location or social and communication records (both discussed later). Payee 121 may manually edit the list of recipients add or remove persons.

Server 111 may identify an amount to request from each request recipient in step 522. In some embodiments, server 111 may automatically identify the amount requested by dividing the total amount into equal shares. In some aspects, different amounts may be specified for particular recipients. For example, in the monthly rent example above with recipients A, B, and C, if in one or more previous monthly rent transactions person A paid $500, person B paid $400, and person C paid $600, then those amounts are automatically set by server 111 for each respective recipient. By doing so, payee 121 can quickly finalize and send the reimbursement request with minimal effort for recurring shared expenses having the same recipients and amounts requested. Payee 121 may also edit the amounts, and server 111 may update learning engine 254 accordingly based on the changed amount and respective recipient data (step not shown).

In step 524 server 111 determines an advance time for sending the reimbursement requests. "Advance time" may be the amount of time prior to the due date of the recurring expense when the reimbursement request is sent to recipients. For example, if a rent payment is due at the first of every month, server 111 may set an advance time of one-week, and the reimbursement requests would be sent to recipients on or around the 23rd day of the preceding month depending on the number of days in the preceding month. In some embodiments, advance time is determined individually for each reimbursement request recipient based on multiple factors. For example, server 111 may determine the advance time based on the amount requested, where a reimbursement request for a large sum of money would result in a greater advance time to allow the payor additional time to gather and send the associated payment. Another factor may include the amount of potential late fees or interest associated with the shared expense payee will make on behalf of payors 122. For example, server 111 may determine a greater advance time where a missed or late payment of the shared expense would result in significant late fee penalties, loss of the underlying product or service, etc. An additional factor may include the reimbursement performance history of the particular recipient. For example, server 111 may set a longer period of advance time for a recipient who has previously sent reimbursements late or required multiple reminders, whereas a recipient who usually sends payment promptly after receiving the first request may receive a shorter advance time. If the recipient is a FSP 110 customer, server 111 may also calculate an advance time period based on the recipient's performance history for making payments to FSP 110 for credit card or loan payments. In some embodiments, recipients may specify a preferred advance time for one or more recurring shared expenses.

Process 500 continues in FIG. 5B. In step 526, the recurring reimbursement request may be sent to each of the identified recipients for the identified amounts. Recipients (now referred to for FIG. 5B as payors 122) may receive reimbursement requests and send payment to payee 121 (steps not shown). In step 528, server 111 may receive and process payments from payors 122. If a reimbursement payment is not received from one or more payors 122 within a predetermined length of time, server 111 may send additional reminders to the non-paying payor(s) (step not shown).

In some embodiments, server 111 may process payment for reimbursement requests automatically (step not shown). For example, server 111 may determine a transaction risk associated with the reimbursement request between payee 121 and payor 122, based on, for example, the amount requested, the amount of interaction between payee 121 and payor 122, and/or any history of reimbursement requests and payments between payee 121 and payor 122. If server 111 determines that the transaction risk is below a predetermined threshold, server 111 may process the reimbursement payment automatically by, for example, deducting the amount requested from payor 122's account and crediting the reimbursement amount to payee 121's account. Transaction risk determinations and automatic payments are discussed in further detail later.

In step 530, server 111 may determine whether the recurring expense payment is due. For example, server 111 may determine whether a rent payment is due to a landlord. If payment is not due (for example, if rent is due on the first of every month and time remains in the preceding month), the process may return to step 528 ("no" in step 532). If payment is due (i.e., it is the first of the month), sever 111 determines whether all payments have been received in step 534 ("yes" in step 532). If all payments have been received from payor(s) 122 ("yes" in step 536), then payment for the recurring shared expense may be made in step 538. For example, server 111 may initiate payment of the full shared expect (i.e., full rent amount) from a financial account of payee 121 associated with FSP 110.

In step 540, server 111 may determine whether additional payments for the recurring shared expense remain. For example, server 111 may determine that remaining monthly payments exist for a lease length and start date. To determine there are additional future payments, and the number of payments remaining, server 111 may receive the total number of payments or time period and frequency of the recurring shared expense (not shown in figures) from payee 121, payor(s) 122, and/or third-party sources such as the lease holder. In some embodiments, server 111 may receive information associated with future payments upon identification of the recurring shared expense in step 510. For example, when a rent payment is first identified as a potential recurring shared expense, server 111 may receive indication from payee 121 that the rent payment is a monthly payment in a lease that ends in one year.

In some embodiments, server 111 may scan payee 121's e-mail, social network profile, and/or other communication records received from one or more third party servers 140, based on payee 121's approval, to identify recurring shared expenses and details of the shared expense (not shown in figures). For example, if payee 121 has previously granted server 111 permission to scan e-mails, server 111 may find that a recent e-mail to persons A, B, and C informed them that "rent is due March 1," or an e-mail from the landlord indicating that "the lease will end on Dec. 31, 2013." Server 111 may compare information mined from payee 121's communication records to payee 121's transaction history to identify potential details about transactions occurring on dates proximate to the communications or proximate to dates stated in the communications. Server 111 may also receive input from payee 121 confirming or rejecting the accuracy of the identified details for a transaction, and server 111 may update learning engine 254 to improve the accuracy of future analysis and identification.

If server 111 determines, or payee 121 manually indicates, that no future payments remain for the recurring shared expense and that the recurring shared expense has completed ("yes" in step 542), then process 500 may end until server 111 detects a new recurring shared expense.

If it is determined in step 542 that additional recurring shared expense payments remain ("no" in step 542), either by server 111 automatically detecting terms of the recurring expense or based on input from payee 121, then server 111 may send the next reimbursement request to the request recipients in step 544. When sending the next request, server 111 may recalculate the advance time (step not shown) for each recipient based on their promptness in sending reimbursement for the previous month(s), and other factors which may increase or decrease the advance time as discussed above. After sending the next reimbursement request, process 500 may return to step 528.

Returning to step 536, if server 111 determines that not all reimbursement payments have been received when payment is due ("no" in step 536), server 111 may determine whether to issue a temporary credit to the non-paying payor(s) in step 546. In some embodiments, server 111 may issue temporary credits only for payors who are also FSP 110 customers. A temporary credit may be part of a line of credit line issued by FSP 110 to payor 122, or it may be a credit from payee 121, where payee 121 pays the payor 122's share and seeks reimbursement later through additional reimbursement requests.

Server 111 may determine a payor 122's eligibility for temporary credit on an individual case-by-case basis. The eligibility for temporary credit may depend on payor 122's credit history, the amount of the reimbursement request, and payor 122's performance history for sending reimbursement. In some embodiments, as discussed above, server 111 may issue temporary credit only for payors 122 who are also FSP 110 customers. Server 111 may query payor 122's credit history and records already in FSP 110's possession, e.g., stored in memory 240 and/or database 270.

In other embodiments, server 111 may request payor 122's credit history from a third party server 140 operated by a credit reporting agency. In some embodiments where payor 122 is not a FSP 110 customer, payor 122 may authorize FSP 110 to pull their credit history for evaluating eligibility to receive a temporary credit.

Referring again to FIG. 5B, when server 111 issues a temporary credit ("yes" in step 548), the recurring shared expense may be paid (step 538), and process 500 continues to step 540 discussed above. Furthermore, server 111 may send a supplemental reimbursement request to payor 122 for the unreimbursed payment and any interest or late payments (step not shown).

To determine whether additional recurring shared expense payments remain, and the number of payments remaining, server 111 may request or otherwise receive information from payee 121. For example, payee 121 may enter the total number of payments or time period and frequency of the recurring shared expense (not shown in figures) upon the first identification of the recurring shared expense (from step 510). For example, when a rent payment is first identified as a potential recurring shared expense, server 111 may receive an indication from payee 121 that the rent payment is a monthly payment in lease that ends in one year. In some embodiments, server 111 may scan payee 121's e-mail, social network profile, and/or other communication records, based on payee 121's approval, to identify recurring shared expenses and the possible details of the shared expense (not shown in figures). For example, if payee 121 has previously granted server 111 permission to scan e-mails, server 111 may find that a recent e-mail to persons A, B, and C informed them that "rent is due March 1," or an e-mail from the landlord indicating that the lease will end on Dec. 31, 2013." Server 111 may compare information mined from payee 121's communication records to the transaction history, to identify potential details about transactions occurring on dates proximate to the communications or proximate to dates stated in the communications. Server 111 may also receive input from payee 121 confirming or rejecting the accuracy of the identified details for a transaction and update learning engine 254 accordingly to improve the accuracy of future analysis and identification.

Referring still to FIG. 5B, if server 111 does not issue a temporary credit ("no" in step 548), server 111 may send a reminder (step 550) and process 500 may return to step 528. In some embodiments, server 111 may pay the recurring expense in step 538 using an amount that is less than full payment by the amount of the non-paying payor 122's share. If process 500 continues ("yes" in step 542, when additional payments remain) server 111 may generate and send the next reimbursement request (step 544). When sending the next reimbursement request, in some embodiments, server 111 may request reimbursement for the amount of the future payments and the past due reimbursement (not shown in figure). Furthermore, server 111 may assess and add a late fee or interest charge to the amount requested from the non-paying payor 122. Late fees and/or interest charges may be calculated based on the contractual terms of the recurring expense. In some embodiments, server 111 may determine of the amount of late fees and/or interest charges based on manually input information received from payee 121. In other embodiments, server 111 may automatically set late fee and/or interest charge amounts based on the details of previous reimbursement requests that included any interest or late fees charges.

Figure 6:
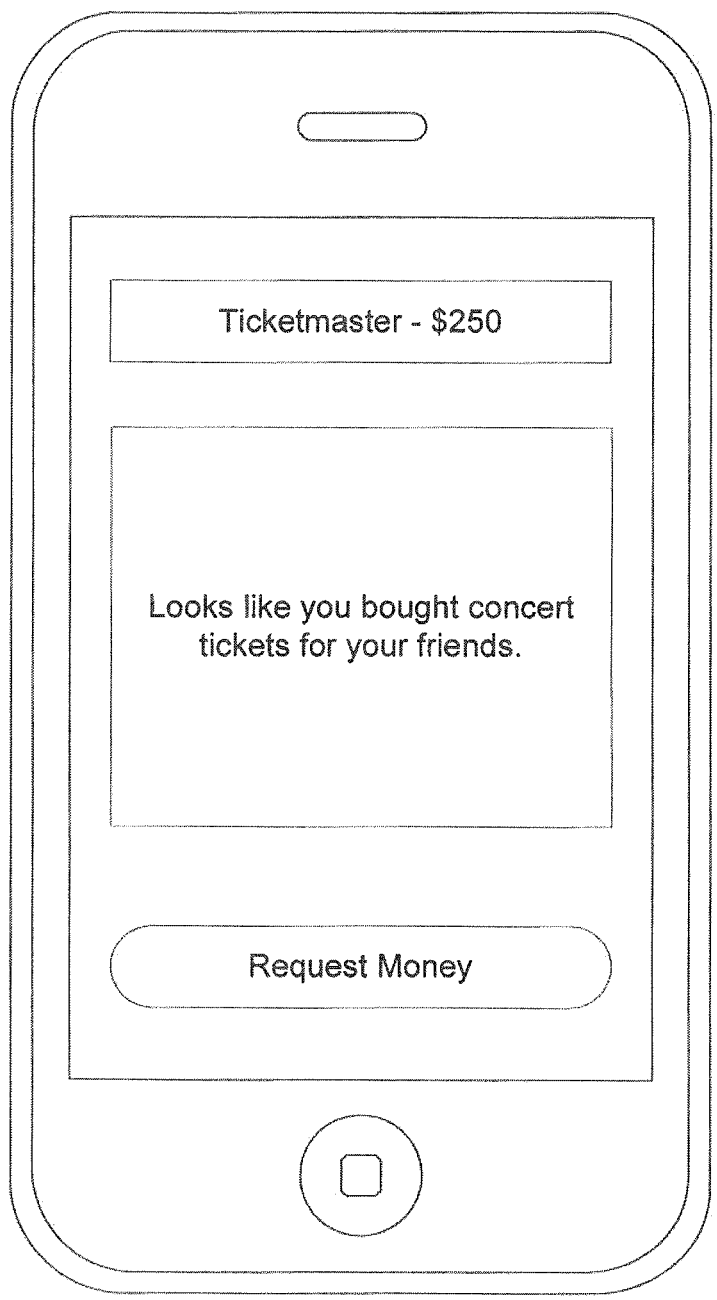
FIG. 6 is an exemplary user interface for requesting reimbursement for a shared expense, consistent with disclosed embodiments.

FIG. 6 shows an exemplary user interface for requesting reimbursement for a shared expense, consistent with disclosed embodiments. The user interface may be displayed on display 150 of payee device 120A. As shown, server 111 may display information reflecting an identified shared purchase from a vendor "Ticketmaster" in the amount of $250. Server 111 may identify the transaction as a shared expense by, for example, comparing the transaction amount to ticket price information received from third party server 140 operated by the vendor Ticketmaster (steps not shown). In the provided example, the transaction amount of $250 is likely too much for a single ticket, and server 111 therefore identifies the purchase as a shared expense. If payee 121 indicated to server 111 that this transaction was not a shared expense, either because payee 121 wanted to buy multiple tickets (for example, as gifts) or because the purchase was for a single ticket, server 111 would update learning engine 254 to improve accuracy of future analysis. In this example, server 111 would update its patterns and thresholds to reflect that this particular payee 121 has spent $250 with Ticketmaster in a non-shared expense. Sever 111 may further include a message to display via the user interface corresponding to the shared expense, such as "looks like you bought concert tickets for your friends." Server 111 may also include a means, such as the button displayed in FIG. 6, that allows payee 121 to interact with the user interface to "Request Money" from the individuals for whom payee 121 purchased tickets.

Figure 7:
FIG. 7 is another example of a user interface for requesting reimbursement for a shared expense, consistent with disclosed embodiments.

FIG. 7 shows another example of a user interface for requesting reimbursement for a shared expense, consistent with disclosed embodiments. As shown, a $170 purchase from Maggiano restaurant has been identified by server 111 as a shared expense. Server 111 may identify the shared expense by comparing the purchase amount to average meal prices. According to some embodiments, server 111 may determine average meal prices based on received information from third party server 140 operated by an information and review service, such as Zagat™ or Yelp™. Based on the comparison with the average meal amount, server 111 may determine that more than an individual meal was purchased.

The user interface may further display a message related to the shared expense and/or identify individuals associated with payee 121 who may have been present at the restaurant at the time of the purchase. In the example, Amy, Jimmy, and Adrian are identified as individuals present at the meal from which payee 121 may wish to request reimbursement.

To identify individuals potentially present at the purchase meal, server 111 may analyze time-stamped location information associated with other FSP 110 customers to identify customers also present at Maggiano around the time of the $170 purchase. For example, a customer may have purchased drinks from Maggiano's bar earlier in the day that the $170 purchase was made. The identified FSP 110 customers may be cross-checked against payee 121's contacts, including those stored in contact lists maintained by server 111, social network connections, contacts listed on phone bills, and/or past reimbursement request recipients. Matches may be identified as potential reimbursement request recipients for the $170 shared expense.

Figure 8:
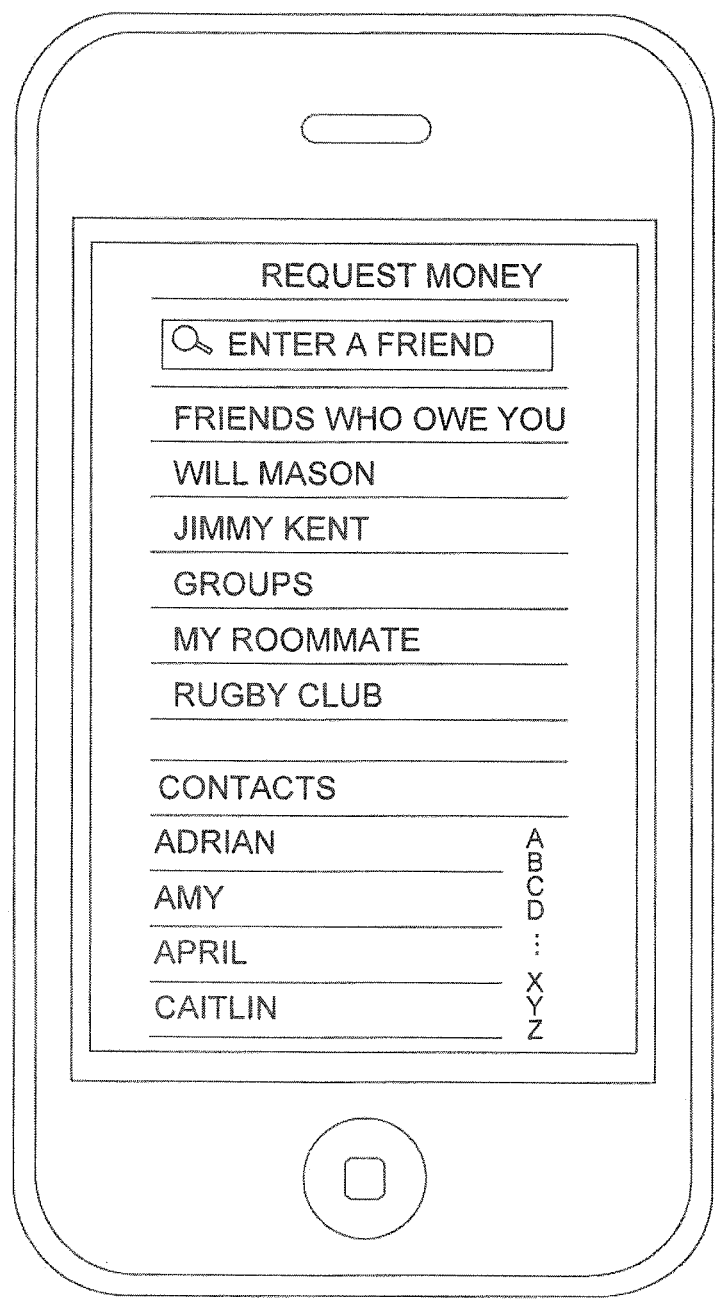
FIG. 8 is an exemplary user interface for selecting reimbursement request recipients, consistent with disclosed embodiments.

FIG. 8 shows an exemplary user interface for selecting reimbursement request recipients. In some embodiments, the user interface may be displayed upon selecting the "request" button of the user interface shown in FIG. 7. Continuing the example discussed above with respect to FIG. 7, contacts may be displayed in the user interface of FIG. 8 for payee 121 to select as reimbursement request recipients. Any recipients that server 111 automatically identified may be displayed at the top of the contacts list, along with frequent recipients, or individuals whom server 111 has determined payee 121 has frequent contact with via e-mail, phone, or social networking. Additionally or alternatively, a full contact list may be displayed to allow payee 121 to selectively add recipients. Server 111 may also receive from payee 121 information identifying recipients who do not appear in the contact list, via an input box on the user interface. The information identifying recipients may include, for example, e-mail address(es), phone number(s), name(s), mailing address(es), etc.

Identifying Shared Expenses

Server 111 may identify shared expenses automatically or manually in response to input from payee 121 via payee device 120A. To identify shared expenses in a transaction history automatically, server 111 may employ learning engine 254 to compare transactions in different categories and with different vendors to threshold amounts and transaction patterns for each vendor and/or category. For example, if the amount of a payment to particular vendor exceeds the vendor threshold, or a payment in a particular category exceeds the category threshold, server 111 may identify the transaction as a potential shared expense.

Thresholds and patterns may be stored in database 270 and/or memory 240 of server 111, and may be continuously updated by learning engine 254 based on, for example, feedback received associated with automatically identified shared expenses. To update thresholds and patterns, server 111 may gather data from third party servers 140, such as average individual meal prices for different restaurants or average ticket prices for certain events or types of events. Such third party servers 140 may be operated by companies which gather information about vendors, such as Zagat™ or Yelp™, or by the vendors themselves, such as various restaurants, stores, or service providers such as Ticketmaster™. Additionally, server 111 may scan FSP 110 customer e-mails, phone bills, and/or social network interaction data to identify possible shared expenses. Third party servers 140 may be operated by e-mail services, telephone service providers, and/or social networks providing data, with the FSP 110 customer's authorization, to server 111. The provided data may be analyzed to detect certain phrases or entries related to transaction history entries.

Server 111 may also gather crowd-sourced data and feedback from FSP 110 customers by, for example, gathering feedback about the accuracy of identified shared expenses. Learning engine 254 may analyze the gathered data and recognize patterns between different FSP 110 customers, vendors, transaction amounts, transaction locations, etc. Learning engine 254 may also establish transaction amount thresholds for different combinations of vendors, transaction categories, and different FSP 110 customers. The thresholds and patterns may be stored in memory 240 and/or database 270.

Server 111 may analyze FSP 110 customer transactions as they occur and compare the transaction amount, time, location, and transaction category to the stored thresholds and patterns. The identification of a potential shared expense or recurring shared expense may trigger the start of the processes discussed with respect to FIGS. 4 and 5A-5B.

Server 111 may analyze location data collected for FSP 110 customers to determine which customers are located proximate to one another at the time of certain transactions. According to some embodiments, location data may be collected from FSP 110 customer mobile devices, such as payee device 120A and payor devices 120B. Location data may be based on GPS location, Wi-Fi-assisted GPS, cellular triangulation, Bluetooth™ LE, or other known location methods. In some embodiments, location may be manually identified by payee 121 or payor 122, or may be inferred based on locations identified in e-mails or social network postings. Based on the collected location data, server 111 may determine which FSP 110 customers gathered in a particular restaurant at the time a purchase transaction occurs. The presence of multiple FSP 110 customers in the transaction location may be considered by server 111 to increase the probability that the transaction is a shared expense.

In some embodiments, server 111 may receive information from payee 121 identifying shared expenses (such as, for example, through manual entry into the user interface) and create a request for reimbursement that includes shared expenses not identified by server 111 and/or not listed on payee 121's transaction history for a particular FSP 110 account(s). To manually identify a shared expense, server 111 may provide an interface allowing payee 121 to access transaction history data via, e.g., a web browser or using FSP app(s) 352. Server 111 may additionally receive information indicating payee 121 selected a particular transaction and/or manually identified the transaction as a shared expense or recurring shared expense, triggering the processes in FIGS. 4 or 5A-5B.

In some embodiments, server 111 may receive information associated with a picture of a paper receipt that, for example, payee 120A took a picture of using payee device 120A (via, e.g., camera 322) and identifying the receipt as a shared expense in FSP app 352. Furthermore, server 111 may receive information associated with bills from other financial institutions scanned or photographed by payee 121 and identifying particular transactions as shared expenses.

Figure 9:
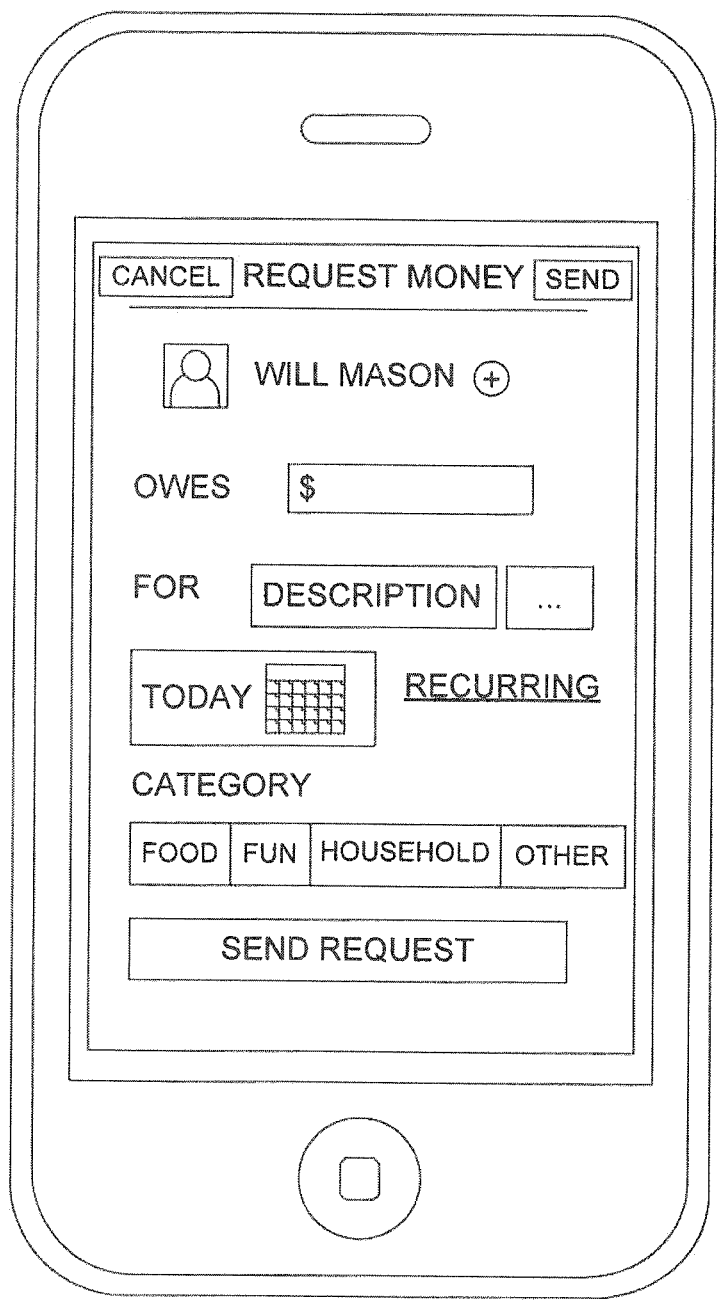
FIG. 9 is an exemplary user interface for generating a recurring shared expense reimbursement request, consistent with disclosed embodiments.

FIG. 9 shows an exemplary user interface for requesting reimbursement of a shared expense. As shown, at the top of the user interface, payee 121 may manually identify the recipient(s) for the request (by, for example, hitting the "+" button). The amount requested for each recipient may also be specified, along with a description of the shared expense. The user interface may also allow payee 121 to designate when to send the request (by, for example, choosing a date upon choosing the calendar button), and also identify whether the shared expense is recurring (e.g., by clicking the "recurring" link). Payee 121 may further categorize the shared expense through the user interface to provide server 111 with information that allows learning engine 254 to update and improve patterns and thresholds used in automatic shared expense recognition. As shown in FIG. 9, potential categories for the expense (such as Food, Fun, or Household) may be suggested to payee 121 based on, for example, transaction information. Server 111 may also receive information indicating additional categories through payee 121's selection the "other" button category and subsequent manual entry of category information. To finalize the request and instruct server 111 to send the request to the identified recipients, a "send request" button is also provided.

Figure 10:
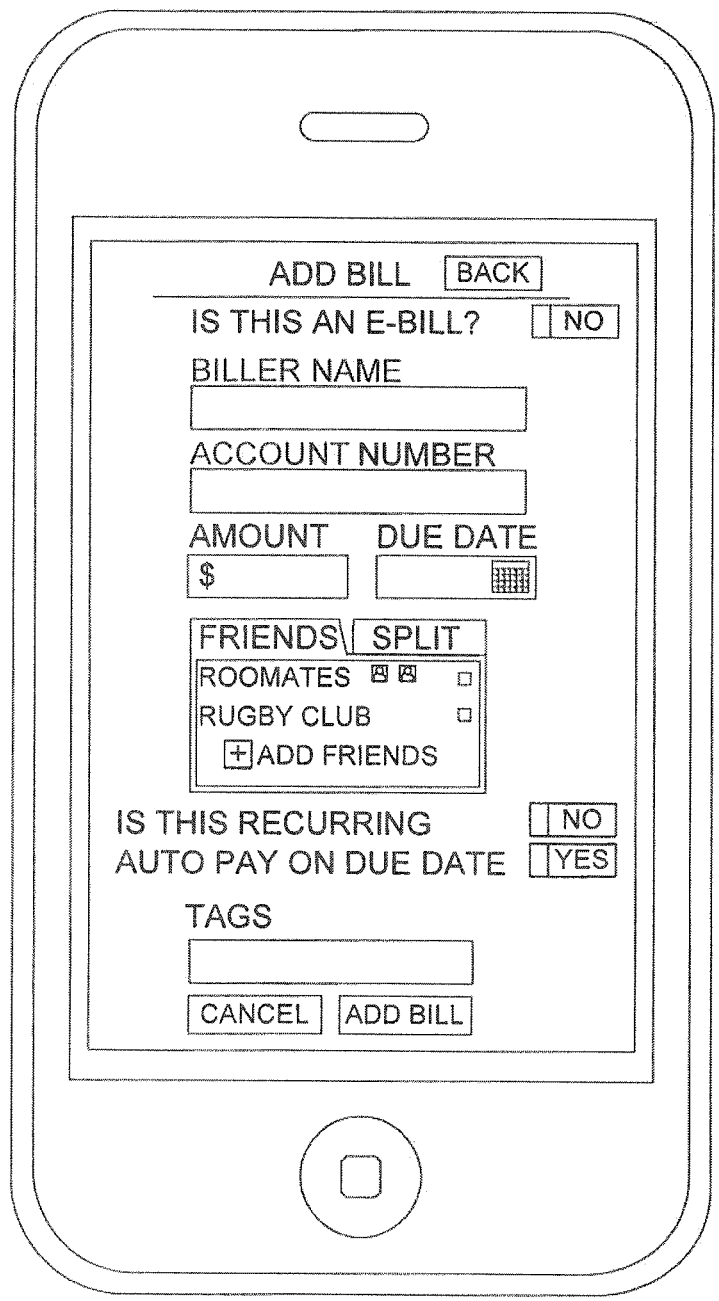
FIG. 10 is an exemplary user interface for manually identifying a shared expense, consistent with disclosed embodiments.

FIG. 10 is an exemplary user interface that allows payee 121 to manually enter bills not listed on the transaction history and/or stored in database 270. The user interface may allow payee 121 to indicate whether the bill is an e-bill, which may allow payee 121 to send payment directly through FSP 110 server 111 using the interface. Portions of the user interface may allow payee 121 to enter the biller name, account number associated with the bill, amount of the bill, and due date. Recipients for a reimbursement request, and the amounts requested from those recipients, may be indicated in the "Friends" and "Split" tabbed boxes, respectively. Recipients may be selected in a manner similar to that described with respect to FIG. 9. Toggle buttons on the user interface may further allow payee 121 to indicate whether the bill is part of a recurring shared expense, and whether payee 121 wants FSP 110 to automatically pay the bill on its due date. Before finalizing and adding the bill, payee 121 may add "tags" to the bill, similar to the indication of categories discussed with respect to FIG. 9, for learning engine 254 to improve accuracy.

Identifying Reimbursement Request Recipients

In some embodiments, server 111 may receive information provided by payee 121 through provided user interfaces that identify request recipients manually. To manually identify recipients, server 111 may provide interfaces allowing payee 121 to select individuals from a contact list stored on payee device 120A, or contacts associated with one or more linked social networks, as discussed above with respect to FIG. 8. Alternatively or additionally, payee 121 can identify recipients who are not already present in a stored contact list or otherwise already associated with payee 121, by entering contact information for the recipient including e-mail addresses, telephone numbers, FSP 110 customer IDs, or social network IDs.

In some embodiments, server 111 may identify one or more recipients based on an indication that payee 121 "bumped" mobile devices with the recipient, transferring information from the recipient's phone identifying the recipient and/or authorizing reimbursement payment(s). For example, when the mobile devices are physically bumped while in a wireless pairing mode, contact information such as the recipient's e-mail address, social network ID, telephone number, and/or FSP 110 customer ID can be automatically transmitted from payor device 120B to payee device 120A. Upon receipt of the recipient contact information, FSP app 352 may automatically update payee device 120A contact lists, and adds the new recipient information to recipient selection lists.

In some embodiments, server 111 may identify request recipients for a shared expense automatically using gathered location data to identify nearby FSP 110 customers at the time of the shared expense transaction. When server 111 or payee 121 identifies a shared expense, server 111 may gather location data for payee device 120A based on Bluetooth™, Bluetooth™ LE, GPS, WiFi, cellular, or other wireless location methods. Server 111 may compare payee device 120A location data to the locations of other FSP 110 customer device locations to identify other FSP 110 customers who are in close proximity to payee 121 at the time of the shared expense transaction. Server 111 may cross-check a list of proximate FSP 110 customers against payee device 120A contact lists and any linked e-mail or social network contact lists to identify matches. The identified matches may be displayed to payee 121 as a potential shared expense group on reimbursement request user interfaces. The display of identified matches may be included in messages to payee 121, such as the message shown in FIG. 7 upon detection of a shared expense for a meal. Server 111 may further receive information indicating payee 121 edited the shared expense group to add or remove recipients before sending a reimbursement request for the shared expense. Based on the addition or removal of automatically identified recipients, learning engine 254 may update patterns and algorithms to improve accuracy of future data analysis.

Sending Reimbursement Payment

Figure 11:
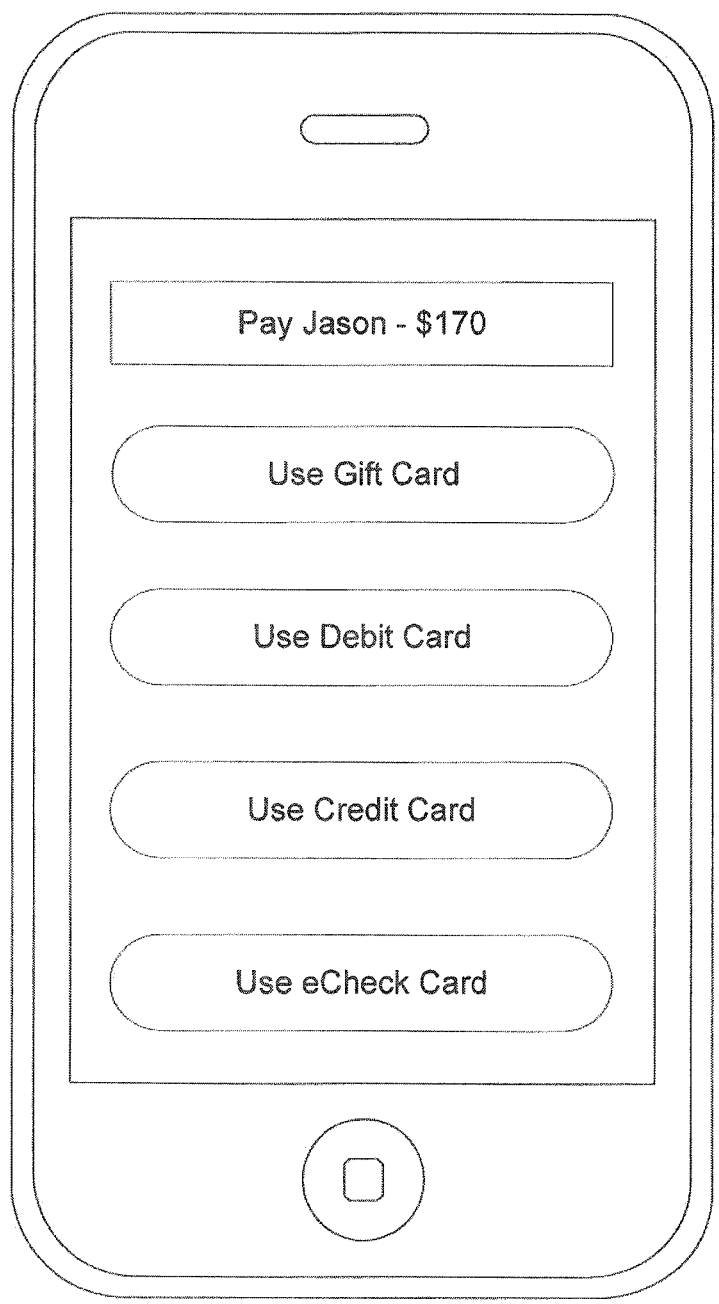
FIG. 11 is an exemplary user interface for sending a reimbursement payment, consistent with disclosed embodiments.

FIG. 11 shows an exemplary user interface for sending payment for a reimbursement request. As shown, the payee 121 and amount requested may be stated at the top of the user interface. A description of the shared expense may also be provided (not shown). Buttons for different payment options may be provided, such as "Use Gift Card," "Use Debit Card," "Use Credit Card," and/or "Use eCheck Card." Payment options may differ depending on whether payor 122 is a FSP 110 customer. If so, a button may be provided to send payment from payor 122's FSP 110 account. Otherwise, payor 122 may select other payment buttons, including buttons for payment by credit card, debit card, e-check, or gift card, as indicated.

In some embodiments, server 111 may provide for payor 122 to send reimbursement payment by gift card. For a payment by gift card, server 111 may receive information from payor 122 associated with the vendor of the gift card, such as "Amazon.com™" or "Starbucks™," and the face value of the gift card. Server 111 may query one or more third party servers 140 operated by gift card marketplace services to determine the percentage value of gift cards for the indicated vendor, and calculate a sale value for the gift card. For example, if third party server 140 indicates to server 111 that a Starbucks™ gift card may be sold for 90% of its face value, then server 111 may calculate a sale value of $90 for a Starbucks gift card with a face value of $100. Server 111 may inform payor 122 of the sale value available for the gift card. If payor 122 choses to proceed with selling the gift card to pay the reimbursement request, server 111 may receive additional information from payor 122 concerning the gift card, such as the gift card code(s) and PIN number(s). In certain aspects, server 111 may also instruct payor 122 to send a physical gift card to payee 121, FSP 110, or the gift card marketplace associated with third party server 140. Server 111 may send the reimbursement payment in the amount of the gift card sale value to payee 121.

In some embodiments, server 111 may receive an indication that payor 122 instructed FSP app 352 on payor device 120B to automatically pay incoming reimbursement requests. Payor 122 may manually indicate to server 111 (via, e.g., FSP app 352 on payor device 120B) a maximum allowable amount for an automatic payment. In some embodiments, server 111 may determine whether to automatically pay payee 121 from payor 122's funds. To make this determination, server 111 may determine the risks associated with the reimbursement request transaction, and authorizes automatic payments for requests having a level of risk below a predetermined level. Server 111 may determine a risk level based on the amount requested by payee 121 and/or the amount of past interaction between payee 121 and payor 122. For example, server 111 may determine whether payee 121 and payor 122 are connected in one or more social networks, listed on one another's contact lists, have been parties to past shared expense requests or payments, and/or the frequency of e-mail, telephone, and/or social network communication between payee 121 and payor 122. Based on a consideration of these factors, server 111 may determine the level of risk in authorizing an automatic payment, where higher levels of risk are associated with less frequent communications and little prior shared expense history, and lower levels of risk are associated with more frequent communications and more substantial shared expense history. In some embodiments, payor 122 may place a limit on automatic payments (via, e.g. FSP app 352 on payor device 120B), such as by instructing server 111 to only authorize low-risk transactions for amounts less than $20.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for managing shared expenses, comprising:
a storage device storing instructions;
a learning engine stored on the storage device, wherein the learning engine is configured to electronically collect and store transaction data from a plurality of users and identify transactions likely reflecting a recurring expense shared by a plurality of individuals; and
at least one processor configured to execute the instructions to perform operations comprising:
detecting, using the learning engine, a potential recurring shared expense based on purchase transaction information associated with a first user, the first user being a customer of a financial service provider;
receiving, from a device associated with the first user, a confirmation indicating that the potential recurring shared expense corresponds to a recurring shared expense;
updating the learning engine based on the confirmation, wherein updating the learning engine comprises updating patterns and thresholds used in automatic shared expense recognition;
identifying, based on the purchase transaction information, a previous transaction associated with the recurring shared expense;
determining a request recipient selected from customers of the financial service provider based on the previous transaction being within a threshold similarity to the potential recurring shared expense;
determining a requested share amount for the request recipient, the requested share amount being based on a share amount associated with the request recipient in the previous transaction;
updating the learning engine based on the request recipient and the requested share amount;
determining an advance time for sending a request for payment to the request recipient, the advance time being determined based on information associated with the request recipient, a number of reminders transmitted to the request recipient associated with the previous transaction, and a penalty shared by each of the plurality of individuals for a late payment of the recurring shared expense; and
transmitting, through a wireless communication, a request for payment to a device associated with the request recipient indicating the requested share amount, the request being transmitted at a time prior to a due date of the recurring shared expense based on the advance time.

2. The system of claim 1, wherein identifying the previous transaction comprises determining that the previous transaction is of a similar type as the recurring shared expense.

3. The system of claim 1, wherein the identifying the previous transaction comprises determining that the previous transaction occurred at a similar time of month as the recurring shared expense.

4. The system of claim 1, wherein the operations further comprise:
receiving, from the device associated with the first user, a revised share amount; and modifying the requested share amount based on the revised share amount.

5. The system of claim 4, wherein:
the requested share amount is determined using the learning engine, and the operations further comprise updating the learning engine based on the revised share amount.

6. The system of claim 1, wherein the advance time is at least partially determined based on the requested share amount.

7. The system of claim 6, wherein the advance time is at least partially determined based on a reimbursement performance history associated with the request recipient.

8. The system of claim 1, wherein the advance time is unique to the request recipient.

9. The system of claim 1, wherein the information associated with the request recipient comprises a preferred advance time and the advanced time is determined based on the preferred advance time.

10. A computer-implemented method for managing shared expenses, comprising:
identifying a potential recurring shared expense based on purchase transaction information associated with a first user, the first user being a customer of a financial service provider;
receiving, from a device associated with the first user, a confirmation indicating that the potential recurring shared expense corresponds to a recurring shared expense;
identifying, based on the purchase transaction information, a previous transaction associated with the recurring shared expense;
determining a request recipient selected from customers of the financial service provider based on the previous transaction being within a threshold similarity to the potential recurring shared expense;
determining a requested share amount for the request recipient, the requested share amount being based on a share amount associated with the request recipient in the previous transaction;
updating a learning engine based on the request recipient and the requested share amount, wherein updating the learning engine comprises updating patterns and thresholds used in automatic shared expense recognition;

determining an advance time for sending a request for payment to the request recipient, the advance time being determined based on information associated with the request recipient, a number of reminders transmitted to the request recipient associated with the previous transaction, and a penalty shared by each of the plurality of individuals for a late payment of the recurring shared expense; and transmitting, through a wireless communication, a request for payment to a device associated with the request recipient indicating the requested share amount, the request being transmitted at a time prior to a due date of the recurring shared expense based on the advance time.

11. The method of claim 10, wherein identifying the previous transaction comprises determining that the previous transaction is of a similar type as the recurring shared expense.

12. The method of claim 10, wherein the identifying the previous transaction comprises determining that the previous transaction occurred at a similar time of month as the recurring shared expense.

13. The method of claim 10, further comprising:
receiving, from the device associated with the first user, a revised share amount; and modifying the requested share amount based on the revised share amount.

14. The method of claim 13, wherein:
the requested share amount is determined using a learning engine, and
the method further comprises updating the learning engine based on the revised share amount.

15. The method of claim 10, wherein the advance time is at least partially determined based on the requested share amount.

16. The method of claim 10, wherein the advance time is unique to the request recipient.

17. The method of claim 16, wherein the advance time is at least partially determined based on a reimbursement performance history of the request recipient.

18. The method of claim 10, wherein the information associated with the request recipient comprises a preferred advance time and the advanced time is determined based on the preferred advance time.

19. The method of claim 18, further comprising receiving, from the device associated with the request recipient, the preferred advance time.

20. A system for managing shared expenses, comprising:
a storage device storing instructions;
a learning engine stored on the storage device, wherein the learning engine is configured to electronically collect and store transaction data from a plurality of users; and
at least one processor configured to execute the instructions to perform operations comprising:
detecting, using the learning engine, a potential recurring shared expense based on purchase transaction information associated with a first user of the plurality of users;
receiving, from a device associated with the first user, a confirmation indicating that the potential recurring shared expense corresponds to a recurring shared expense;
identifying, based on the purchase transaction information, a previous transaction associated with the recurring shared expense;
determining a request recipient associated with the previous transaction, based on the previous transaction being within a threshold similarity to the potential recurring shared expense;
determining a requested share amount for the request recipient, the requested share amount being based on a share amount associated with the request recipient in the previous transaction;
updating the learning engine based on the request recipient and the requested share amount, wherein updating the learning engine comprises updating patterns and thresholds used in automatic shared expense recognition;
determining an advance time for sending a request for payment to the request recipient, the advance time being unique to the request recipient, a number of reminders transmitted to the request recipient associated with the previous transaction, and a penalty shared by each of the plurality of individuals for a late payment of the recurring shared expense; and
transmitting, through a wireless communication, a request for payment to a device associated with the request recipient indicating the requested share amount, the request being transmitted at a time prior to a due date of the recurring shared expense based on the advance time.

* * * * *